United States Patent [19]

Araseki

[11] 4,288,664
[45] Sep. 8, 1981

[54] NEUTRALIZATION SIGNAL DEVELOPING DEVICE FOR AN ECHO SUPPRESSOR

[75] Inventor: Takashi Araseki, Tokyo, Japan

[73] Assignee: Nippon Electric Co., Ltd., Tokyo, Japan

[21] Appl. No.: 52,151

[22] Filed: Jun. 26, 1979

[30] Foreign Application Priority Data

Jun. 30, 1978 [JP] Japan .................................. 53-80121

[51] Int. Cl.³ .......................... H04Q 1/46; H04B 3/20
[52] U.S. Cl. ................................ 179/170.2; 179/170.4
[58] Field of Search ............ 179/170 A, 170.2, 170.4, 179/170.6, 170.8; 370/24, 27

[56] References Cited

U.S. PATENT DOCUMENTS

| | | | |
|---|---|---|---|
| 3,069,501 | 12/1962 | Gilman et al. | 179/170.2 |
| 3,560,669 | 2/1971 | Foulkes et al. | 179/170.2 |
| 3,647,993 | 3/1972 | Foulkes et al. | 179/170.2 |
| 3,783,194 | 1/1974 | Vilips et al. | 179/2 DP |
| 3,935,403 | 1/1976 | Penicaud et al. | 179/170.2 |
| 4,001,505 | 1/1977 | Araseki et al. | 179/1 P |
| 4,194,092 | 3/1980 | Luder | 179/170.4 |

*Primary Examiner*—Bernard Konick
*Assistant Examiner*—Randall P. Myers
*Attorney, Agent, or Firm*—Sughrue, Rothwell, Mion, Zinn and Macpeak

[57] ABSTRACT

A device for developing a neutralization signal for an echo suppressor is required for the transmission of data over a telephone line having four-wire circuits. Each transmission of data is preceded by an identification signal at a given frequency. An input analog signal including the identification is sampled and quantized so that each sampled value is encoded into a binary codeword composed of a sign bit and a preset number of bits representing the magnitude of the analog signal. The device includes a detecting circuit to detect the identification signal, a level assessing circuit to assess the level of the codeword sequence, and a hangover circuit responsive to the detecting circuit and the level assessing circuit to develop the neutralization signal. The detecting circuit includes a bit pattern generator which produces successive bit patterns from sign bits of the codeword sequence. The bit patterns are in turn used to produce a first detection signal if the bit patterns coincide with a first predetermined bit pattern and a second detection signal if the bit patterns coincide with a second predetermined bit pattern. A counter is responsive to the first and second detection signals to increase its contents by a first number of the first detection signal is generated at any one of predetermined recurrence cycles and to decrease its contents by a second number if the second detection signal is generated. The content of the counter are compared with a predetermined value, and a detection output is produced when the contents of the counter exceed the predetermined value.

6 Claims, 8 Drawing Figures

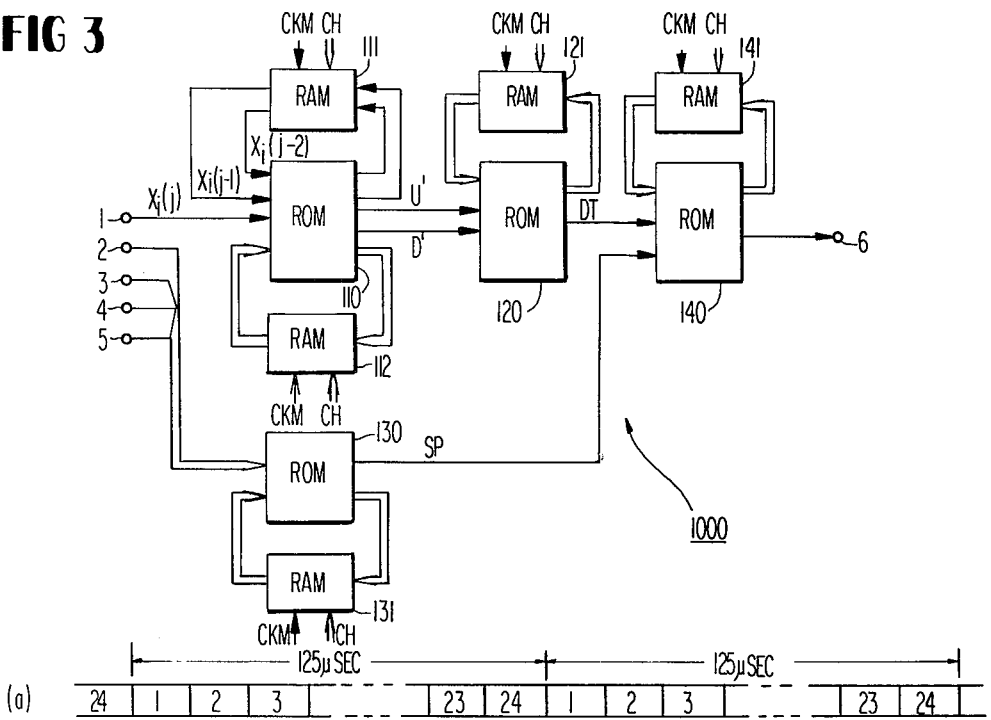
FIG 3
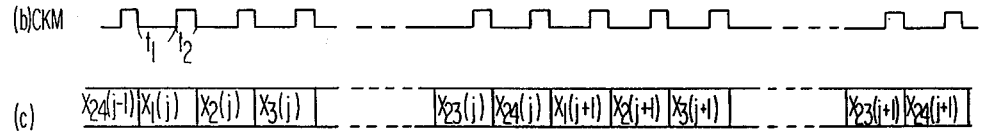
FIG 4
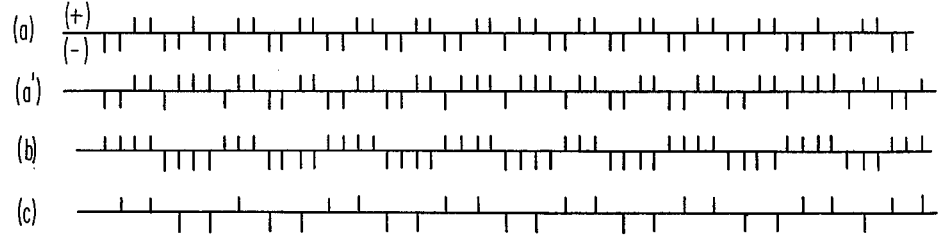
FIG 5
FIG 6
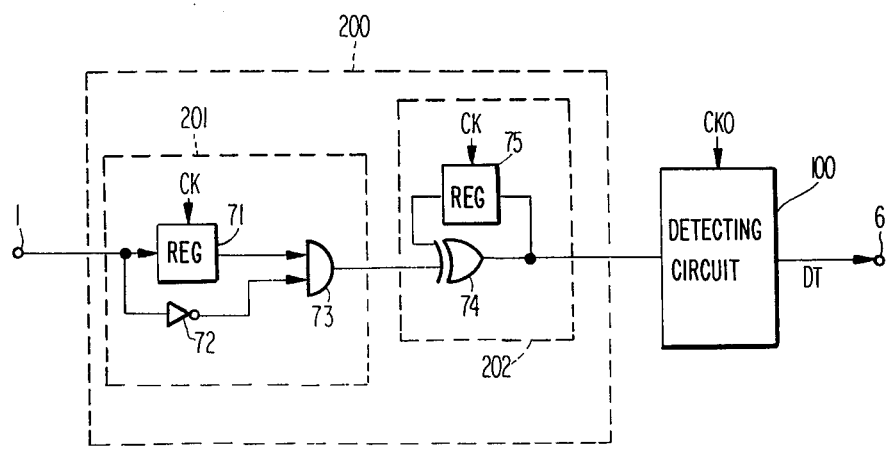

NEUTRALIZATION SIGNAL DEVELOPING DEVICE FOR AN ECHO SUPPRESSOR

BACKGROUND OF THE INVENTION

This invention relates to a neutralization signal developing device for an echo suppressor, which is required for data transmission over a telephone transmission line having four-wire circuits.

A commercial telephone transmission line generally consists of a two-wire circuit in the vicinity of each subscriber and a four-wire circuit for the long-distance link, with a hybrid circuit connecting them. At the hybrid circuit, however, echoes are produced in a transmission line when an impedance discontinuity or mismatch exists. The annoying effects of echoes can be minimized by the use of an echo suppressor which is situated near one end of a four-wire circuit to disable the outgoing, or echo return, path from a particular subscriber when signals from the far-end subscriber appear on the incoming path. This can be achieved by monitoring the levels of speech signals on the outgoing and incoming paths and by inserting a comparatively large loss into the outgoing path to reduce the level of echoes only when the signal level on the incoming path is higher than that of the outgoing path.

Meanwhile, when data transmission is carried out through a four-wire circuit connected to such an echo suppressor using modulators and demodulators (MODEMs), which are installed at both terminal stations, the coincident transmission of data from the MODEMs occurs frequently. If the signal level of data on the outgoing path is lower than that of data on the incoming path, data from at least one MODEM cannot be transmitted because of the above-mentioned operation of said echo suppressor. For this reason, means responsive to an identification signal, which is given from the MODEM immediately before data transmission, for neutralizing the operation of the echo suppressor, is indispensable for the transmission of data from the MODEMs. In this connection, the C.C.I.T.T. (see International Telecommunication Union, Sixth Plenary Assembly, Orange Book, Volume III-1, 1977, Recommendation G-161, pp. 93-94) has recommended that said neutralizing means should satisfy the following requirements:

(1) An identification signal, i.e., a disabling tone preceding the transmission of data shall be continuously emitted 400 milliseconds at a frequency of 2,100±15 Hz; (2) in view of the characteristics of the transmission line, neutralizing means shall operate under the effect of the identification signal having a frequency of 2,100±21 Hz; and (3) said means shall operate in 300±100 milliseconds after the reception of the identification signal.

An example of such a neutralizer satisfying the requirements of the C.C.I.T.T. recommendation includes a structure using an analog band-pass filter as illustrated in FIG. 2 of a paper titled "629 Tone Disabler" published in Wescom, Inc., Circuit Description/Installation Series, Section 629-101/3, March issue, 1972. There is a disadvantage, however, that this analog neutralizer has a complicated structure. Meanwhile, a digital neutralizer to solve this problem has been proposed in U.S. Pat. No. 3,935,403 issued to Penicand et al. In this device, the detection of the identification signal is carried out by counting the number of variations (zero-crossings) in sign of the sampled signal during a given period of time.

As a result, this device has a problem similar to that of the analog device.

SUMMARY OF THE INVENTION

An object of the present invention is, therefore, to provide a simply structured neutralization signal developing device for an echo suppressor free from the above-mentioned disadvantages in the prior-art devices.

In one aspect of the present invention, there is provided a device for developing a neutralization signal for an echo suppressor, which is required for the transmission of data over a telephone line having four-wire circuits, each transmission of data being preceded by an identification signal at a given frequency, an input analog signal including said identification signal being sampled and quantized so that each sampled value is encoded into a binary codeword composed of a sign bit and a preset number of bits representing the magnitude of said analog signal, said device comprising: means for receiving the series of codewords; means responsive to said codeword sequence for detecting said identification signal; means responsive to said codeword sequence for assessing the level of said codeword sequence; and means responsive to the outputs of said level assessing means for developing a neutralization signal for the echo suppressor, wherein said detecting means includes means for producing successive bit patterns from sign bits of said codeword sequence; means responsive to said bit patterns for producing a first detection signal if one of said bit patterns coincides with a first predetermined bit pattern and producing a second detection signal if one of said bit patterns coincides with a second predetermined bit pattern; means responsive to said first and second detection signals for increasing its contents by a first predetermined number if said first detection signal is generated at any one of predetermined recurrence cycles and decreasing its contents by a second predetermined number if said second detection signal is generated; and means responsive to the output of said counting means for producing a signal indicating the presence of said identification signal if the output of said counting means exceeds a predetermined value.

According to another aspect of the present invention, there is provided a device for developing a neutralization signal for an echo suppressor, which is required for the transmission of data on a telephone line having four-wire circuits, each transmission of data being preceded by an identification signal at a given frequency, an input analog signal including said identification signal being sampled and quantized so that each sampled value is encoded into a binary codeword composed of a sign bit and a preset number of bits representing the magnitude of said analog signal, said device comprising: means for receiving the series of codewords; means responsive to said codeword sequence for detecting said identification signal; means responsive to said codeword sequence for assessing the level of said codeword sequence; and means responsive to the outputs of said detecting means and said level assessing means for developing a neutralization signal for the echo suppressor, wherein said detecting means includes means for dividing the recurrence cycle of sign bits of said codeword sequence by a predetermined value; means responsive to the output of said frequency dividing means for successively producing bit patterns; means responsive to said bit patterns for producing a first detection signal if each of said bit patterns coincides with a first predetermined bit pattern and producing a second detection signal if each of said bit patterns coincides with a second predetermined bit pattern; means responsive to said first and second detection signals for increasing its contents by a first predetermined number if said first detection signal is generated at any one of predetermined recurrence cycles and decreasing its contents by a second predetermined number if said second detection signal is generated; and means responsive to the output of said counting means for producing a signal indicating the presence of said identification signal if the output of said counting means exceeds a predetermined value.

BRIEF DESCRIPTION OF THE DRAWINGS

Next, the present invention will be described in detail by the following detailed description with reference to the accompanying drawings, in which:

FIG. 3 is a block diagram illustrating a second embodiment of this invention;

FIGS. 4 (a) through (c) show waveforms to illustrate the operation of the second embodiment;

FIGS. 5 (a), (a'), (b), and (c) show waveforms to illustrate the operation of a third embodiment of this invention;

FIG. 6 is a block diagram illustrating the third embodiment;

In the drawings, like reference numerals represent like structural elements.

DESCRIPTION OF THE PREFERRED EMBODIMENTS

Figure 1:
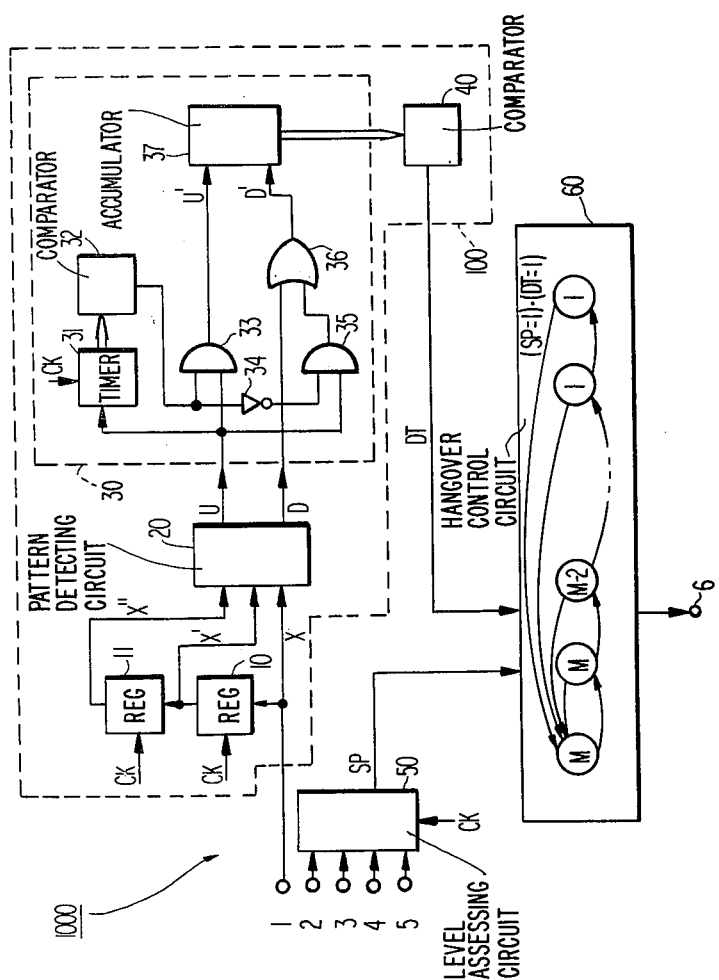
FIG. 1 is a block diagram illustrating a first embodiment of this invention.

Referring to FIG. 1, the device 1000 of this invention has a well-known PCM coder which receives an input analog signal including an identification signal given through a four-wire circuit from a MODEM of a terminal station. The analog signal is sampled at a rate of 8 KHz, each sample being subsequently converted into a 5-bit codeword by the PCM coder. The 5-bit codeword comprises magnitude bits and 1 sign bit. It is to be noted that, for the brevity of drawing, said four-wire circuit, PCM coder, MODEM, and terminal station are not illustrated here.

Figure 2:
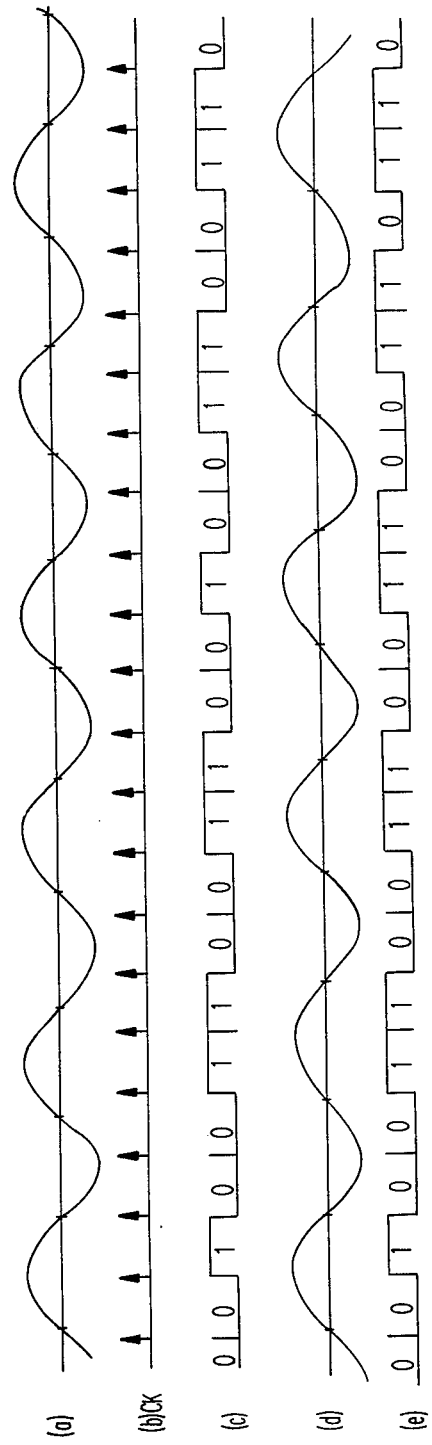
FIGS. 2 (a) through (e) show waveforms illustrating the operating principles of this invention.

More in detail, referring to FIGS. 2 (a) through (e), changes in sign bit of codewords (FIGS. 2 (c) and (e)) are obtained by sampling sinewaves of 2200 Hz (FIG. 2 (a)) and 2120 Hz (FIG. 2 (d)) at a sampling clock CK of 8 KHz (FIG. 2 (b)), respectively. Bits "1" and "0" in FIGS. 2 (c) and (e) represent positive and negative signs, respectively. As is easily understood from FIG. 2 (c), bit "0" ("1") appears after a bit pattern "11" ("00"). Similarly, in FIG. 2 (d), a bit "0" ("1") appears after a bit pattern "11" ("00") has been repeated a few times. Also, whereas a bit pattern "101" periodically emerges at every tenth codeword in FIG. 2 (c), a bit pattern "101" or "010" emerges at every 17th codeword in FIG. 2(e). These facts show that the recurrence cycle of the bit pattern "101" or "010" is determined depending on the frequency of sinewave used.

The present invention is, therefore, so structured as to detect an identification signal (ID signal) having a frequency of 2100 Hz using the recurrence cycle of said bit pattern ("101" or "010").

For this purpose, the present device of FIG. 1 further includes a detecting circuit 100 which detects said ID signal in response to a sign bit sequence fed to the terminal 1; a level assessing circuit 50 which, in response to magnitude bits for level indication of each codeword given to the input terminals 2 through 5, assesses the level of said series of codewords (codeword sequence); and a hangover control circuit 60 which, in response to the outputs of said circuits 100 and 50, produces a neutralization signal at an output terminal 6 to neutralize the operation of an echo suppressor. The detecting circuit 100 is composed of a bit pattern generating circuit having registers 10 and 11 to form a three-bit pattern out of the sign bit sequence from the input terminal 1; a pattern detecting circuit 20 which gives a first detection signal U when said bit pattern coincides with a first predetermined bit pattern "101" or "010" and gives a second detection signal D when said bit pattern coincides with a second predetermined bit pattern "111" or "000"; a counter 30 whose contents are increased by 1 when said first bit pattern is generated at any one of predetermined recurrence cycles and whose contents are decreased by 2 in response to said second bit pattern; and a comparator 40 which issues a signal indicative of the presence of said ID signal when the output of said counter 30 is greater than a predetermined value. The counter 30 comprises a timer 31 to count the intervals of the first bit pattern; a comparator 32 to compare an interval-indicating signal given from the timer 31 with a predetermined value; an AND gate 33 for generating an addition control signal U' in response to the output of the comparator 32 and the first detection signal U given from the pattern detection circuit 20; means consisting of an inverter 34, an AND gate 35 and an OR gate 36, for generating a subtraction control signal D' in response to the second detection signal D from said circuit 20 and the output of said comparator 32; and an accumulator 37 to increase its contents by 1 in response to the addition control signal U' from said AND gate 33 and to reduce its contents by 2 in response to the subtraction control signal D' from the OR gate 36. For further details of the level assessing circuit 50 and the hangover control circuit 60, the structures shown in FIG. 1 of the U.S. Pat. No. 4,001,505 issued to Takashi Araseki et al. on Jan. 4, 1977 and in FIG. 2 of the above-mentioned Wescom paper can be employed, respectively.

The pattern detecting circuit 20 is comprised of a read only memory (ROM), which has the input-output relationship shown in the following Table. More specifically, in the Table, a three-bit pattern derived from the sign bit sequence is used as an address for said ROM, and the detection signals U and D are information stored in the ROM.

TABLE

| Addresses (input) | | | Detection Signals (output) | |
|---|---|---|---|---|
| $A_1$ | $A_2$ | $A_3$ | U | D |
| 0 | 0 | 0 | 0 | 1 |
| 0 | 0 | 1 | 0 | 0 |
| 0 | 1 | 0 | 1 | 0 |
| 0 | 1 | 1 | 0 | 0 |
| 1 | 0 | 0 | 0 | 0 |
| 1 | 0 | 1 | 1 | 0 |
| 1 | 1 | 0 | 0 | 0 |

TABLE -continued

| Addresses (input) | | | Detection Signals (output) | |
|---|---|---|---|---|
| $A_1$ | $A_2$ | $A_3$ | U | D |
| 1 | 1 | 1 | 0 | 1 |

Next, the operation of the embodiment of the invention will be described in detail referring to FIGS. 1 and 2 (a) to (e).

Each sign bit of FIG. 2 (e) obtained from five-bit codewords is serially given to the input terminal 1 in synchronism with the clock CK (FIG. 2 (b)), and the remaining four bits are supplied to the terminals 2 to 5 at the same clock rate CK. Said sign bit is stored in the register 10 at the clock rate CK. The output signal of the register 10 is further stored in the register 11 at the clock rate CK. Three sign bits (X, X', X'') from three consecutive codewords appear at the input terminal 1, register 10, and register 11, respectively. The sign bit pattern (X, X', X'') is given to the pattern detecting circuit 20. The circuit 20 supplies the detection signals U and D according to Table shown above. If, for instance, the sign bit pattern (X, X', X'') coincides with the first bit pattern "101" or "010", the detection signal U will be "1", and if the bit pattern (X, X', X'') coincides with the second bit pattern "111" or "000", the detection signal D will be "1". Or if the sign bit pattern (X, X', X'') takes any one of the bit patterns "001", "011", "110", and "100", both the signals U and D will be "0". It should be noted that U=D="0" are outputed as long as bit patterns "11" and "00" are repeated, and U="1" is outputed when either "1" or "0" appears independently. The signals U and D are given to the counter 30. The signal U is supplied to the timer 31 to clear its content. When the signal U becomes equal to "1", the timer 31 starts counting the clock pulses CK. The contents of the timer 31 is given to the comparator 32. The comparator 32 gives "1" as its output when the contents of the timer 31 is equal to or greater than 16 (corresponding to 2 milliseconds) but equal to or less than 24 (corresponding to 3 milliseconds). The comparator 32 also gives "0" when the contents of the timer 31 takes any other value. The values 16 and 24 are equal to the recurrence cycles of the first bit pattern, which appears in the sign bit sequence obtained by sampling the ID signal lying within the range of frequencies 2100±21 Hz recommended by the C.C.I.T.T. If the frequency 2, 100 Hz is employed, the recurrence cycle will be 20. Consequently, if the detection signal U is "1" in a recurrence cycle over 2 to 3 milliseconds, the signal U' will be made "1". On the other hand, if the signal U is "1" in a recurrence cycle shorter than 2 milliseconds or longer than 3 milliseconds, the signal U' will be "0" and the signal D', "1". If the signal D is "1", the signal U' will be "0" and the signal D', "1". These signals U' and D' are given to the accumulator 37, which increases its contents by 1 when U'="1" and reduces its contents by 2 when D'="1". However, the minimum value of the contents of the accumulator 37 is 0, and the maximum is 100, so that even if the ID signal having a frequency of 2,100 Hz is supplied continuously to the input terminals 1 to 5, the contents of the accumulator cannot be increased beyond 100. The contents of the accumulator 37 is given to the comparator 40. As soon as the contents of the accumulator reach 100, the comparator will give an output signal DT="1" to indicate the presence of an ID signal. If the contents of the accumulator 37 is between 0 and 99 inclusive, the output signal Dt will be "0". The four magnitude bits of each codeword, which are given to the input terminals 2 through 5, are sent to the level assessing circuit 50, which gives "1" as its output signal SP when the signal level exceeds a predetermined value. The output signal DT of the comparator 40 and the output signal SP of the circuit 50 are given to the hangover control circuit 60. The control circuit 60 operates in the following manner: The circuit 60 has a counter with internal states of M+1. In the internal state "0", if the level of a codeword sequence exceeds the predetermined level (SP="1"), the codeword sequence is determined to be an ID signal (DT="1") with the result that said internal state "0" is changed to "M". While the state of SP="0" is continued, the internal state is decreased from "M" by "1" at a time towards 0. When the internal state is between 1 and M - 1 inclusive, it advances to M if SP equals "1". The circuit 60 produces at the terminal 6 a signal for neutralizing the operation of the echo suppressor.

Thus, in the presence of the ID signal, the neutralization signal is "1" and will be maintained at "1" if any signal, e.g., data, is given the input terminals 1 through 5 shortly after the disappearance of the neutralization signal. By supplying the neutralization signal to the echo suppressor, echo suppression can be prohibited during the transmission of data.

FIG. 3 illustrates a second embodiment of the present invention, which is applied to a 24-channel PCM system. In the figure, a 24-channel structure corresponding to the single-channel structure of registers 10 and 11 of FIG. 2 is comprised of a random access memory (RAM) 111 having 24 storage areas, each corresponding to a channel storing two sign bits, which are obtained from three consecutive codewords corresponding to one channel. Channel numbers are used as addresses for the RAM 111. Similarly, the 24-channel structures corresponding to the one-channel structures of the pattern detecting circuit 20, comparator circuit 32, AND gate 33 and subtracting means (inverter 34, OR gate 36 and AND gate 35) timer 31 accumulator 37 comparator circuit 40 level assessing circuit 50 and hangover control circuit 60 are realized by ROM 110, RAM 112 and ROM 110, ROM 120 and RAM 121, ROM 120, ROM 130 and RAM 131 and ROM 140 and RAM 141, respectively. In a manner similar to that of the RAM 111, each of the RAMs 112, 121, 131, and 141 has 24 storage areas, each corresponding to a channel, and uses channel numbers as address signals.

Next, the operation of the embodiment of FIG. 3 will be described referring to FIGS. 4 (a) to (c).

Each of the sign bits from 24-channels is time-division multiplexed as shown in FIG. 4 (a), which is given to an input terminal 1 in sychronism with clock CKM (FIG. 4 (b)) at a rate (5.21 microseconds) equal to 1/24 of the sampling rate of 125 microseconds. As soon as sign bit $x_1$ (j) (FIG. 4 (c)) of the j-th codeword from a channel 1 is given to the terminal 1 during the period $t_1$ of clock CKM, a sign bit $x_1$ (j-1) of the j-1th codeword form the channel 1, which was given 125 microseconds before, and a sign bit $x_1$ (j-2) of the j-2th codeword from the channel 1, which was given 250 microseconds before, are read out from address 1 of the RAM 111 and supplied to the ROM 110. During this period $t_1$, a value corresponding to the content of the timer 31 of FIG. 1 is read out from address 1 of the RAM 112 and fed to the ROM 110. The ROM 110 detects a three-bit pattern consisting of the sign bits $x_1$ (j), $x_1$ (j-1) and $x_1$ (j-2) supplied by the RAM 111, derives therefrom the signals U and D of FIG. 1, and produces the addition control signal U' or the subtraction control signal D' on the basis of these signals U and D and a value fed from the RAM 112 corresponding to the output of the timer 31. The signals U' and D' from the ROM 111 are supplied to the ROM 120. During the period $t_2$ of the clock CKM, only the two newer sign bits $x_1$ (j) and $x_1$ (j-1) are written into address 1 of the RAM 111. It is to be noted here that, during the period $t_1$ of the clock CKM, the contents stored at address 1 of the RAM 121 corresponding to that of the accumulator 37 of FIG. 1 is read out and supplied to the ROM 120. Simultaneously, in response to the output of the ROM 120, the contents of the accumulator 37 is increased or descreased in response to the value of the signal U' or D'. The result is given to the RAM 121, and at the same time judges whether or not the contents of the accumulator is greater than 99. If it is greater than 99, the ROM 120 produces at the terminal 6 a signal DT indicative of the detection of the ID signal. In this manner the detection of the ID signal is completed from channel 1 in 125/24 microseconds, and that from channel 2 is detected in the following 125/24 microseconds.

The first and second emodiments are based on the assumption that sign bits "1" and "0" are generated at equal probability as illustrated in FIG. 5 (a). However, when said orginal analog signal is converted onto codewords, the intermediate value, i.e., zero volt of the analog signal sometimes fails to become the corresponding intermediate value 00000 of the codeword owing to the variation in zero level (i.e., offset) caused by aging and temperature change of the PCM coder described in connection with FIG. 1. In this case the probability of the sign bits "1" and "0" will differ from each other as illustrated in FIG. 5 (a'), and consequently the sign bit sequence of FIG. 5 (a') may fail to properly actuate the present device of FIGS. 2 and 3.

FIG. 6 shows a third embodiment of the present invention, which solves this problem. In this embodiment is arranged, before a detecting circuit 100, a frequency dividing circuit 2000 to convert the offset-influenced sign bit sequence of FIG. 5 (a') into the unaffected sign bit sequence of FIG. 5 (a). In the figure, the circuit 200 is composed of a changing point detecting circuit 201 which detects the change from "1" to "0" in each sign bit (FIG. 5 (a')) given at the input terminal 1, and an inverting circuit 202 which produces an output inverse to its immediately preceding output when the output of the detecting circuit 201 is "1". For instance, if the output of the circuit 202 is "0", when "1" is supplied from the detecting circuit 201, the following output of the inverting circuit 202 will change to "1". The circuit 201 is comprised of a register 71, an inverter 72, and an AND gate 73. Also, the inverting circuit 202 consists of an Exclusive OR circuit 74 and a register 75. The output of the frequency dividing circuit 200 is a sign bit sequence in which "1" and "0" occur with equal probability as illustrated in FIG. 5 (b). The output of the circuit 200 is supplied to the detecting circuit 100, which operates at a clock rate of 4 KHz equal to ½ of that of the input sign bit sequence. As a result, the circuit 100 processes a sign bit sequence which, as illustrated in FIG. 5 (c), is derived by thinning out the sign bit sequence of FIG. 5 (b). The sign bit sequence of FIG. 5 (c) is formed by doubly extending that of FIG. 5 (a) along the time domain. This means that the conversion of the bit sequence of FIG. 5 (a') into that of FIG. 5 (a) has been accomplished. If the detecting circuit 100 is to be used with an 8 KHz clock, the pattern detecting circuit 20 will have to be so altered as to detect "111" or "000" in view of the fact that the output of the register 75, as illustrated in FIG. 5 (b), repeats "1111" and "0000" and gives "111" or "000" at regular intervals. In such instance, it is preferable to reset the threshold value of the comparator 32.

Figure 7:
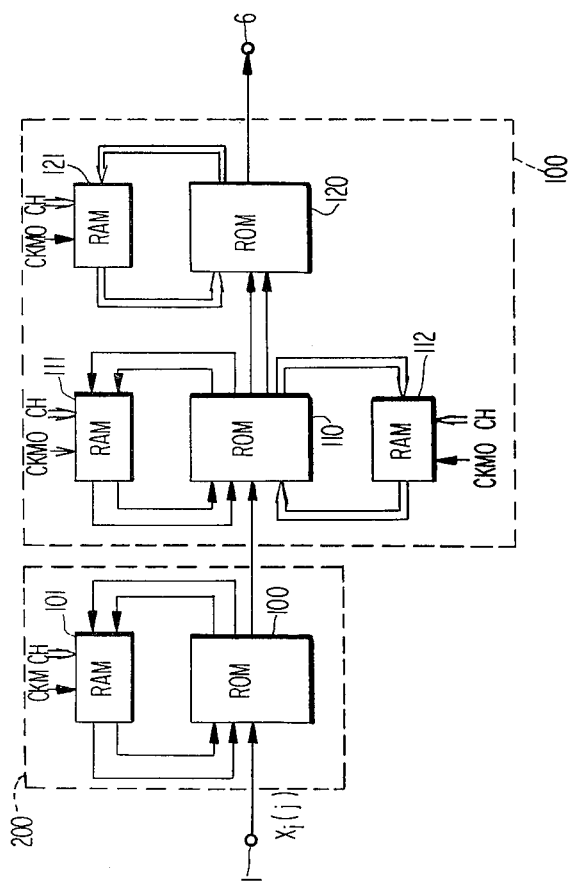
FIG. 7 is a block diagram illustrating a fourth embodiment of this invention.
Figure 8:
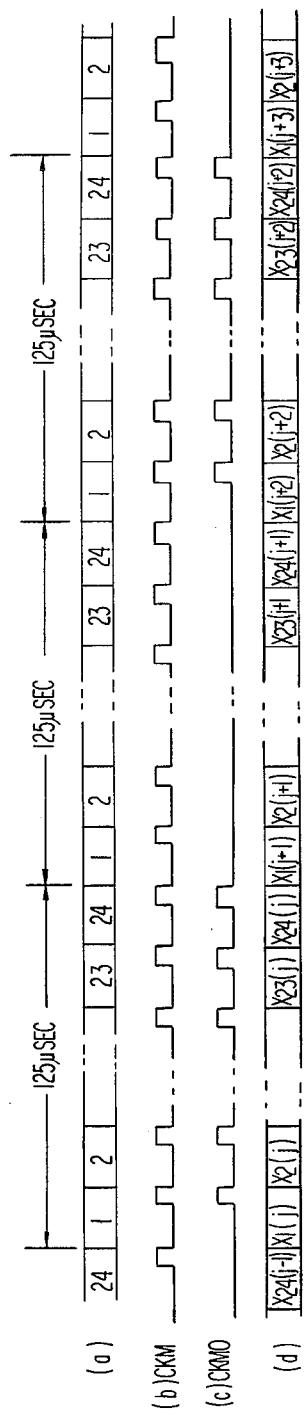
FIGS. 8 (a) through (d) show waveforms to illustrate the operation of the fourth embodiment.

FIG. 7 is a block diagram of a fourth embodiment, which shows an improvement of the device of FIG. 3 vulnerable to the above-mentioned offset effect. In this embodiment, to the stage preceding a detecting circuit 100 is added a frequency dividing circuit 200 consisting of an RAM 101 and an ROM 100 to eliminate the offset of sign bit sequences from plural channels. As in the second embodiment, a time-division multiplexed sign bit sequence (FIG. 8 (d)) is fed to an input terminal 1 in synchronizm with a clock CKM (FIG. 8 (b)) at a rate of equal to 1/24 of the sampling rate of 125 microseconds. The registers 71 and 75 of FIG. 6 are made up of the RAM 101 and the gates 73 and 74 and the inverter 72 of FIG. 6 are made up of the ROM 100. The RAM 101 has 24 storage areas, each corresponding to a channel and having a first sub-area in which the contents of the register 71 is to be stored and second sub-area in which that of the register 75 is to be stored. In this first sub-area is stored the sign bit fed to the input terminal 1 and in the second sub-area, the output of the ROM 100. In 1/24 of a 125-microsecond sampling rate (FIG. 8 (a)) is achieved processing of each channel. Frequency division is accomplished by the ROM 100 and RAM 101, and their outputs are given the detecting circuit 100, which is structured in exactly the same way as the corresponding circuit (110~112, 120, 121) in the second embodiment of FIG. 3 but differs from it in the manner in which the clock is given. The clock CKMO used in the detecting circuit 100, as illustrated in FIG. 8 (c), appears and disappears at 125-microsecond intervals. Therefore, the circuit 100 processes the sign bit of each channel in every other sampling period. For example, the detecting circuit 100, after processing the sign bit $x_1$ (j) shown in FIG. 8 (d), processes the sign bit $x_1$ (j+2) which is apart from the sign bit $x_1$ (j) by one sampling period.

Numerous and varied other alternatives may be derived by those skilled in the art without departing from the spirt and scope of the invention.

What is claimed is:

1. A neutralization signal developing device for an echo suppressor, which is required for the transmission of data over a telephone line having four-wire circuits, each transmission of data being preceded by an identification signal at a given frequency, an input analog signal including said identification signal being sampled and quantized so that each sampled value is encoded into a binary codeword composed of a sign bit and a preset number of bits representing the magnitude of said analog signal, said device comprising:

means for receiving the series of codewords;

means responsive to a portion of each codeword in said series of codewords for detecting said identification signal;

means responsive to another portion of each codeword in said series of codewords for assessing the level of said series of codewords; and means responsive to the outputs of said detecting means and said level assessing means for developing a neutralization signal for the echo suppressor, wherein said detecting means includes means for successively producing bit patterns from sign bits of said series of codewords;

means responsive to said bit patterns for producing a first detection signal if one of said bit patterns coincide with a first predetermined bit pattern and producing a second detection signal if one of said bit patterns coincides with a second predetermined bit pattern;

counting means responsive to said first and second detection signals for increasing its contents by a first predetermined number if said first detection signal is generated at any one of predetermined recurrence cycles and decreasing its contents by a second predetermined number if said second detection signal is generated; and means responsive to the output of said counting means for producing an output signal indicating the presence of said identification signal if the output of said counting means exceeds a predetermined value.

2. A neutralization signal developing device for an echo suppressor, which is required for the transmission of data over a telephone line having four-wire circuits, each transmission of data being preceded by an identification signal at a given frequency, an input analog signal including said identification signal being sampled and quantized so that each sampled value being encoded into a binary codeword composed of a sign bit and a preset number of bits representing the magnitude of said analog signal, said device comprising:

means for receiving the series of codewords;

means responsive to a portion of each codeword in said series of codewords for detecting said identification signal;

means responsive to another portion of each codeword in said series of codewords for assessing the level of said series of codewords; and means responsive to the outputs of said detecting means and said level assessing means for developing a neutralization signal for the echo suppressor, wherein said detecting means includes means for dividing the recurrence cycle of sign bits of said series of codewords by a predetermined value;

means responsive to the output of said dividing means for successively producing bit patterns;

means responsive to said bit patterns for producing a first detection signal if each of said bit patterns coincides with a first predetermined bit pattern and producing a second detection signal if each of said bit patterns coincides with a second predetermined bit pattern;

counting means responsive to said first and second detection signals for increasing its contents by a first predetermined number if said first detection signal is generated at any one of predetermined recurrence cycles and decreasing its contents by a second predetermined number if said second detection signal is generated; and means responsive to the output of said counting means for producing an output signal indicating the presence of said identification signal if the output of said counting means exceeds a predetermined value.

3. A neutralization signal developing device as recited in claim 1 or claim 2 wherein said counting means comprises:

timer means reset by said first detection signal for generating said predetermined recurrence cycles; and accumulator means responsive to the output of said timer means and said first and second detection signals for increasing its contents by said first predetermined number if said first detection signal is generated during said predetermined recurrence cycles and decreasing its contents by said second predetermined number if either said second detection signal is generated at any time or said first detection signal is generated at other than said predetermined recurrence cycles.

4. A neutralization signal developing device as recited in claim 1 or claim 2 wherein said means for successively producing bit patterns and said means for producing said first and second detection signals comprise a random access memory and a read only memory, said random access memory producing together with an input sign bit said bit patterns, said read only memory being responsive to said bit patterns for producing said first and second detection signals.

5. A neutralization signal developing device as recited in claim 1 or claim 2 wherein said counting means includes timer means for generating said predetermined recurrence cycles and wherein said means for successively producing bit patterns and said means for producing said first and second detection signals comprise first and second random access memories and a read only memory, said first random access memory producing together with an input sign bit said bit patterns, said second random access memory producing an output corresponding to said predetermined recurrence cycles, and said read only memory being responsive to said bit patterns and said second random access memory output for generating said first and second detection signals.

6. A neutralization signal developing device as recited in claim 2 wherein said means for dividing the recurrence cycle of sign bits comprises:

detecting means for detecting the change from "1" to "0" of each sign bit; and inverting means for producing an output inverse to its immediately preceding output when the output of said detecting means is "1".

* * * * *

UNITED STATES PATENT AND TRADEMARK OFFICE
CERTIFICATE OF CORRECTION

PATENT NO. : 4,288,664
DATED : September 8, 1981
INVENTOR(S) : Takashi ARASEKI

It is certified that error appears in the above—identified patent and that said Letters Patent is hereby corrected as shown below:

In the Abstract, second column, line 22, delete "of" and
    insert -- if --
Column 3, line 47, after "comprises" insert -- 4 --
Column 6, line 1, delete "Dt" and insert -- DT --
    line 57, delete "(c)" and insert -- (c)) --
Column 7, line 28, delete "onto" and insert -- into --
    line 42, delete "2000" and insert -- 200 --

Signed and Sealed this

Twelfth Day of January 1982

[SEAL]

Attest:

GERALD J. MOSSINGHOFF

Attesting Officer    Commissioner of Patents and Trademarks